United States Patent [19]

Reisgies

[11] 4,190,021
[45] Feb. 26, 1980

[54] AUTOMATIC STIMULATION APPARATUS FOR MILKING MACHINES

[76] Inventor: Rolf W. Reisgies, 2101 Norco Dr., Norco, Calif. 91760

[21] Appl. No.: 908,078

[22] Filed: May 22, 1978

[51] Int. Cl.$^2$ .............................................. A01J 5/04
[52] U.S. Cl. .............................. 119/14.44; 119/14.08
[58] Field of Search ......................... 119/14.44, 14.08

[56] References Cited

U.S. PATENT DOCUMENTS

| | | | |
|---|---|---|---|
| 1,204,458 | 11/1916 | Kricke | 119/14.44 |
| 1,358,987 | 11/1920 | Prince | 119/14.44 X |
| 3,991,716 | 11/1976 | Reisgies | 119/14.08 |

OTHER PUBLICATIONS

Troger, F. et al., "Verfahren Zur Mechanisierung Des Anrustens (Eutermassage) beim Melken der Kuhe mit der Melkmaschine", Tierzucht, 4/67, (Z39), 1967.
Frommhold, W., "Uber die Wirkung mechanischer und thermischer Reize bei der Stimulierung der Euters auf den Melkprozess", Wiss. Z. Karl Marx Univ., Leipzig, Math.-Naturwiss. R., 21 Jg., (1972), H.3.
Wehowsky, G., et al., "Uber die Automatisierung des Arbeitsganges 'Stimulieren' zur Auslosung des Milcher-jektions-reflexes beim maschinellen Melken", Monatshefte fur Verter-inarmedizin, Heft 15, Seiten 581–586, 29 Jr. 1974.

Primary Examiner—Louis G. Mancene
Assistant Examiner—Daniel J. Leach
Attorney, Agent, or Firm—Isaksen, Lathrop, Esch, Hart & Clark

[57] ABSTRACT

Apparatus used in conjunction with milking machines for automatically stimulating the cow to facilitate milk let-down. Upon initiation of the milking cycle, the apparatus provides a controlled higher than atmospheric pressure to the air intake port of the vacuum line pulsator. An alternating vacuum and air pressure is thereby applied between the teat cup shell and inflation to provide a massaging action which causes stimulation of the cow and full milk let-down. Timing means are provided in the apparatus to shut off the air pressure to the pulsator a selected period of time after initiation of the stimulation, and to thereafter supply filtered atmospheric air to the pulsator to allow milking to continue in the usual manner.

8 Claims, 4 Drawing Figures

AUTOMATIC STIMULATION APPARATUS FOR MILKING MACHINES

BACKGROUND OF THE INVENTION

1. Field of the Invention

This invention pertains generally to the field of automatic milking machines, and particularly to stimulating systems for automatically stimulating milk let-down in a cow.

2. Description of the Prior Art

Proper milking procedures require that the cow be stimulated prior to the initiation of milking in order to cause the milk in the udder to "let-down". The milk in the upper structure of the udder is contained in so-called alveoli, small cell-like structures surrounded by muscle tissue. Proper stimulation of the udder apparently provides a neurological signal which causes release of a substance known as oxytocin into the blood stream of the cow. The oxytocin has the effect of stimulating the muscle tissue surrounding the alveoli and causing them to contract to force the milk out.

Milk let-down on a cow can be stimulated by a number of events, especially those which are associated by the cow with milking time. In automatic milking operations, the stimulation is commonly accomplished by spraying or washing the udder with warm water, hand massaging the udder for a few seconds or stripping for milk.

Unpublished research from the University of Leipzig in Germany indicates that maximum generation of oxytocin, and resulting maximum let-down of milk, is obtained by forcefully squeezing all teats for at least approximately 60 seconds. It is assumed that the resulting increase in milk production from this type of stimulation is due to greater amounts of oxytocin being released at approximately the same time, which causes immediate and full let-down in the cow. Using this procedure, the University of Leipzig reported a moderate increase in production for the first lactation after instituting the stimulation procedure. Greater increases were found in the second half of the first lactation and in the second lactation. It is believed that with this type of stimulation, the cow not only injects oxytocin into the blood stream, but also small amounts of a hormone called prolactin. This second hormone is not entirely understood but is believed to have some connection to the development of the udder. Stimulation in this manner over a period of time thus appears to result in an increase in the mass of alveoli producing milk, and therefore increased milk production in the second lactation as reported.

Stimulation procedures that depend on the actions of the operator, such as hand stripping of the teats or washing of the udder, are unreliable because the operator may change his actions from day to day. Stimulating procedures which wet the udder can also be undesirable where the cow immediately leaves the milking barn with a wet udder and can be exposed to cold weather.

SUMMARY OF THE INVENTION

The apparatus of this invention is adapted for use with standard milking machines which employ a pulsating vacuum to draw the milk from the cow's udder. In such milking machines, the area between the inner liner or inflation and the outer shell of the teat cup is alternately pulsed between atmospheric pressure and a "vacuum", which alternately opens and closes the inflations to expose the teats to the vacuum in the milk line. The apparatus is adapted to be connected to the atmospheric air input provided on all standard pulsators such that the pulsators will continue to operate in a normal manner, but will be supplying alternating "vacuum" pressure and high pressure to the teat cups during the stimulation period. The flow of air to the teat cups during the "high pressure" portion of each cycle is controlled so that the maximum air pressure on the inflation is preferably in the range of 5 to 10 psig (pounds per square inch gauge). The stimulation period timing is controlled such that stimulation will be applied for a selected period of time after the teat cups have been emplaced, preferably 60 to 70 seconds, after which time the apparatus will automatically cease stimulation and will provide atmospheric air to the pulsator to allow the pulsator to continue to function in a normal manner. Thus, stimulation is accomplished utilizing equipment that is already available in a standard automatic milking operation, and provides the most effective stimulation procedure for accomplishing milk let-down that is presently known.

The control of the stimulation procedure is preferably accomplished entirely pneumatically without the need for electrical or electronic control components and their accompanying dangers of shorts, shocks to animals and operators, and general unreliability in the wet environment of a milking parlor. The stimulator control can be used with automatic milking machine detaching equipment, in which case the start signal from the automatic detacher is used to initiate the stimulation cycle. Where automatic detachers are not being used, a separate actuator can be provided which, upon manual initiation by the operator, provides to the stimulator control both air pressure for transfer to the pulsator and an initiation signal which triggers the timing cycle in the stimulator control. The control itself includes a flow restrictor which cuts down the air pressure to be supplied to the pulsator and thence to the teat cups, an air flow control valve which distributes air to the pulsator from either the restrictor or from an atmospheric fresh air supply, and a timer controlling the air flow valve and responsive to the signal from the actuator to switch the air flow valve from the air pressure position to the atmospheric air position a selected period of time after the milking cycle has been initiated. The output from the stimulator control, either air under pressure or atmospheric air, is provided to an adapter which attaches to the vacuum line pulsator and directs the air from the stimulator control into the atmospheric air ports on the pulsator. The adapter may include an indicator which shows the presence of air pressure in the system to indicate to the operator that the milking equipment is in the stimulation mode.

Further objects, features, and advantages of the invention will be apparent from the following detailed description taken in conjunction with the accompanying drawings showing a preferred embodiment of automatic stimulation apparatus for milking machines in accordance with the invention.

DESCRIPTION OF THE PREFERRED EMBODIMENT

Figure 1:
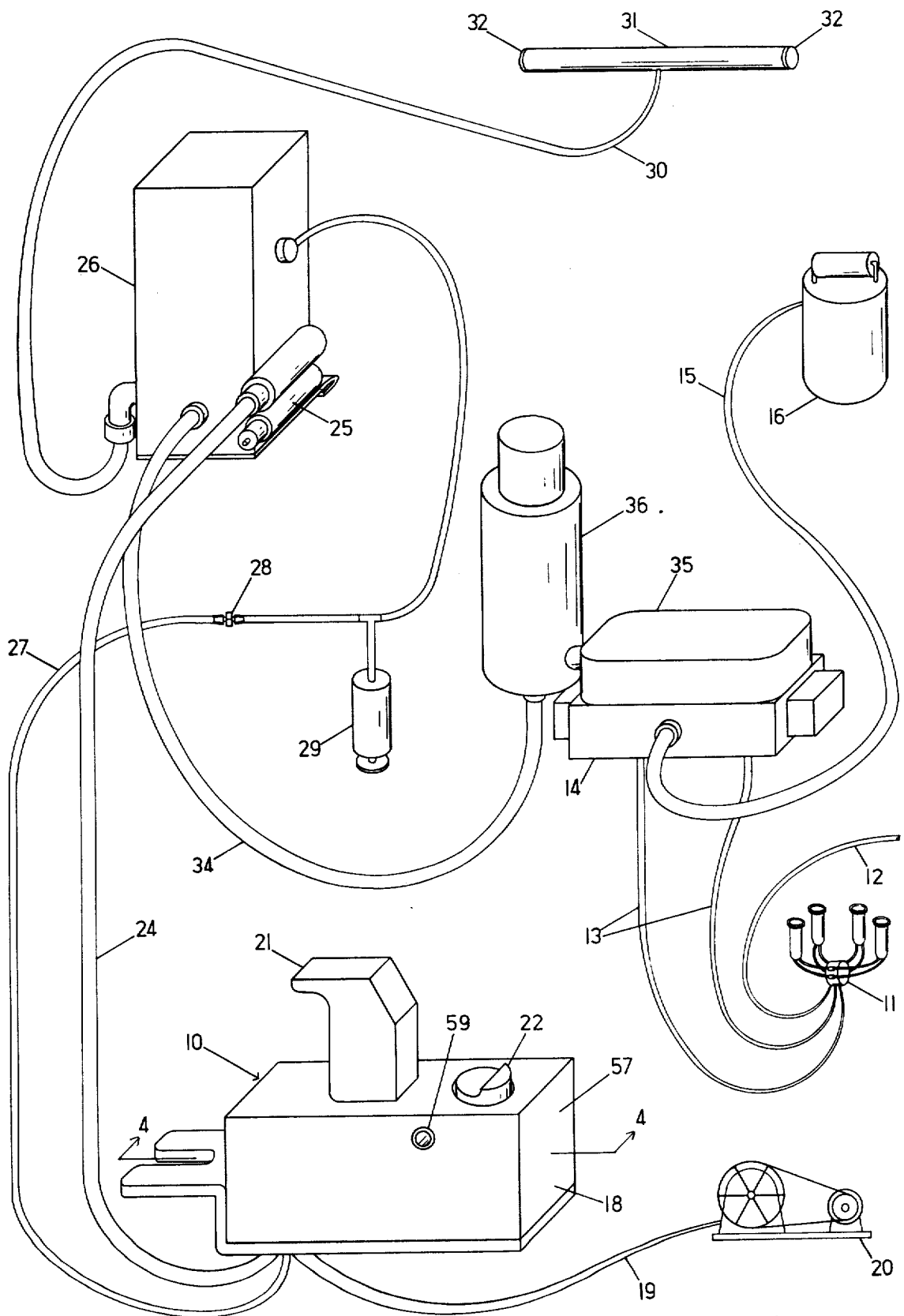
FIG. 1 is a schematic view of portions of a standard milking system and the automatic stimulation apparatus of the invention shown interconnected therewith.

Referring now more particularly to the drawings, wherein like numerals refer to like parts throughout the several views, a preferred embodiment of the automatic stimulation apparatus utilizing a manual actuator is shown generally at 10 in FIG. 1, in conjunction with portions of a standard milking system shown schematically. The standard parts of the milking system include a teat cup cluster 11, a milk hose 12, a double pulsator hose 13, a pulsator 14, and a vacuum line 15 leading to a vacuum pump 16. The portions of the milking system shown in FIG. 1 are shown for illustrative purposes only, and it is understood that other equivalent milking system arrangements can be utilized, including those employing automatic teat cup detachers which sense the cessation of milk flow and automatically detach the teat cups from the cow.

The manually initiated stimulation apparatus shown in FIG. 1 utilizes a claw hanger actuator 18 connected by an air pressure line 19 to a compressor 20 which provides a source of high pressure air. It will be understood that by "high pressure air" it is meant air that is at a pressure above the ambient atmospheric air. It is preferred that the compressor provide a relatively constant air pressure despite varying flow rates, at a pressure which is sufficiently high to allow convenient adjustment as explained below. The claw hanger 18 is adapted to have the teat cup claw or cluster unit rest thereon engaged over a hook 21 and resting on an actuator button 22. A high pressure air supply line 24 leads from the claw hanger actuator, through an adjustable air flow supply restrictor 25, to a housing 26 containing air flow control elements (not shown). A second air pressure control line 27 leads from the claw hanger actuator through a fixed air flow restrictor 28 to the housing 26. A normally closed manually operated air pressure release valve 29 is Tee connected to the control line 27 between the restrictor 28 and the housing.

An atmospheric air input line 30 leads from connection to the housing 26 preferably to an atmospheric air pipe 31 which is opened to the ambient atmosphere through filters 32 at the open ends at the pipe. The purpose of the air pipe 31 and the filters 32 is to provide filtered atmospheric air which can be drawn into the pneumatic controls with minimal risk of clogging the control equipment with dirt and dust particles.

An output line 34 leads from the control housing to an indicator/adaptor 35 which is mounted to the pulsator 14. Commercial pulsators are available in a variety of constructions and methods of operation, but all common pulsators have an atmospheric air input port, and the adaptor 35 is constructed to fit the particular pulsator which it is to be used with such that the output from the adaptor is placed into substantially non-leaking engagement with the input port of the pulsator 14.

Figure 2:
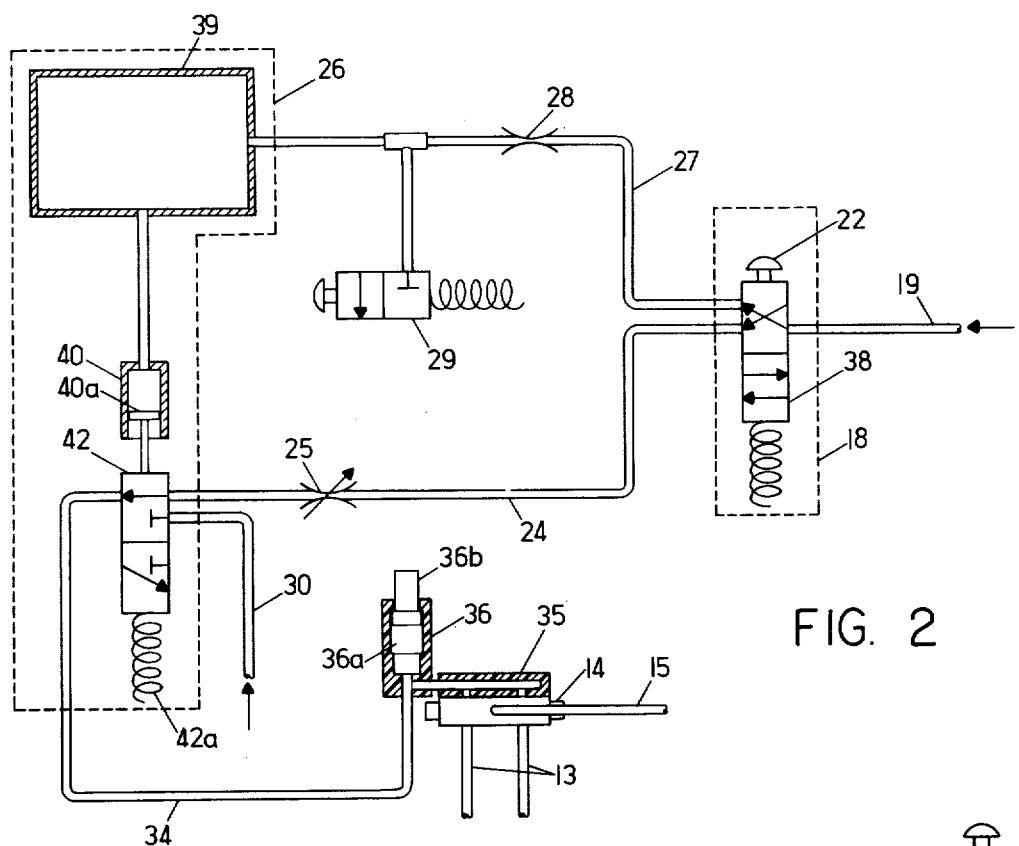
FIG. 2 is a schematic air circuit diagram of the stimulator control apparatus utilizing a manual actuator.

The functioning of the stimulating apparatus is best shown with reference to the schematic view of FIG. 2. High pressure from the air line 19 is directed to one of the input ports of a spring loaded four-way valve 38 contained with the claw hanger actuator housing shown illustratively by the dashed line labeled 18 in FIG. 2. The valve 38 is preferably a two position four-way valve which is in the position shown in FIG. 2 when the teat cup cluster is resting on the button 22. In this position, the air pressure from the line 19 is directed to the control line 27, while the air supply line 24 is vented to the atmosphere. When the teat cup cluster is removed from the button 22, the valve 38 is spring biased upwardly to its second position in which air from the line 19 is directed to the air supply line 24 and the control line 27 is vented to the atmosphere.

In the position of the valve 38 shown in FIG. 2, high pressure air in the line 27 is passed through the flow rate restrictor 28 into a timing chamber 39 contained within the control housing 26. The timing chamber 39 is in communication with the interior of the air cylinder portion of a pilot drive 40 having an air driven piston 40a therein. The piston 40a is connected to drive a two position valve 42, also contained within the control housing 26. Eventually, the pressure in the timing chamber builds up to a pressure sufficient to trip the pilot drive 40 and force the piston 40a to drive the valve 42 to its second position which is shown in FIG. 2. The valve 42 is biased in the reverse direction by a spring 42a, which will drive the valve back to its first position when the force of air pressure against the piston 40a drops below a predetermined level. In the position of the valve 42 shown in FIG. 2, there is no stimulation pressure applied, since the line 24 is still connected through the valve 38 to the atmosphere. It is also noted that the atmospheric air intake line 30 is directed into one of the two input ports of the valve 42, and in the position shown in FIG. 2, is blocked by the valve.

It is noted that as long as the valve 38 is depressed by virtue of the claw resting on the button 22, air pressure will continue to build up in the timing chamber 39 until eventually the pressure within the chamber will be equal to the air pressure in the line 19.

When the operator removes the teat cup cluster from the claw hanger actuator, the button 22 no longer depresses the valve 38, and the valve then is spring biased to its second position in which the air pressure line 19 is connected to the air pressure supply line 24, and the control line 27 is vented to the atmosphere. The air at high pressure in line 24 passes through a variable restrictor 25 and thence through the valve 42, which is still in its position shown in FIG. 2, thus passing through to the stimulator line 34 and into the adaptor 35. The adaptor 35, shown in FIG. 2 in cross-section, includes an indicator 36 connected between the line 34 and the adaptor body. The indicator has a hollow chamber 36a therein and a piston indicator 36b which rides up and down within the chamber. When air under pressure is applied to the line 34, the piston 36b will rise above the top of the indicator to show to the operator that the stimulator is functioning. When the stimulator is off, exhaust air at atmospheric pressure will be drawn in through the line 34 and the indicator piston 36b will be withdrawn back into the chamber 36a.

The air under pressure passing through the adaptor 36 is directed to the atmospheric air input ports of the pulsator 14. The pulsator is preferably of the type which alternately pulses two of the teat cups of the four cup cluster at a time, and thus two vacuum lines 13 leading to the teat cup cluster are shown in FIG. 2. Such pulsator constructions are preferred with the apparatus of the invention, since they do not require as great an air flow over a short period of time in order to provide the desired stimulation pressures to the teat cups. However, the apparatus of my invention can also be used with single vacuum line pulsators by increasing the flow rate into the pulsator.

At the time that the valve 38 is switched to its position opposite to that shown in FIG. 2, the air within the timing chamber 39 begins to flow back outwardly through the restrictor 28 and the air line 27 into the atmosphere. Eventually, the pressure within the chamber 39 is lower than that required to hold the piston 40a against the force of the spring 42a, and thus the valve 42 switches to its position opposite to that shown in FIG. 2. In this switched position, the air pressure line 24 is blocked by the valve 42, and the supply line 34 is connected to the atmospheric air line 30 such that filtered atmospheric air will now be supplied to the pulsator 14 and milking proceeds in the usual manner. The air being drawn into the pulsator through the line 34 will tend to draw the piston indicator 36b downwardly into the chamber 36a and will thus indicate to the operator that the stimulator system has shut off.

The relationship between the volume of the timing chamber 39, the size of the orifice 28, and the pressure on the piston 40a that is required to trip the valve 42, can be selected such that any desired timing period can be obtained during which the stimulation air pressure is being supplied to the pulsator. As indicated above, it is preferred that the system be sized such that the stimulation pressures are applied for approximately 60 to 70 seconds, this being experimentally determined as the optimum stimulation time to adequately stimulate most cows. Of course, it is possible to replace the fixed restrictor 28 with a variable restrictor, such that the flow rate in and out can be adjusted to suit the differences between various groups of cattle.

Although the timing of the stimulation cycle is preset to provide the optimum stimulation period, in some instances it may be desired to cut short stimulation for various reasons. In order to allow the manual discontinuance of the stimulation cycle, a manually operated pressure release valve 29 is tied into the pressure supply line 27 such that the operator, by pressing on the valve 29, can immediately release the pressure within the chamber 39 to cause the switching of the valve 42.

As indicated above, it is desired that the maximum pressure applied to the teat cup inflations and thence to the teats of the cow be in the range of 5 to 10 psig. However, it is not necessarily desirable that this pressure is applied in a single sharp pulse to the teat cups. It will be apparent from an examination of the air circuitry shown in FIG. 2 that as the pulsator 14 cycles between providing high pressure (above atmospheric) and low pressure (below atmospheric or "vacuum"), the pressure applied to the inflation does not change instantaneously because of the various restrictions in the supply line and the air capacity of the teat cups and the various air lines. In particular, it is noted that the restrictor 25 provides a restricted fairly constant stream of air flow which is driven by the high pressure source on the supply line 19. For milking parlor applications, the compressor output will typically be regulated to a pressure in the range of 75 psig. For the short periods of time that the air pressure line 34 is connected by the pulsator to the teat cup vacuum lines 13 (approximately ½ second), the flow rate through the supply restrictor 25 will be fairly constant. Because of the air volume capacity of the supply lines and the space between the teat cup shell and the interior inflation, at the start of each pressure cycle the pressure will build up from the previous vacuum or low pressure level and will increase above atmospheric at a fairly linear rate until it reaches the maximum massage pressure of approximately 5 to 10 psig. At the end of the pressure portion of the cycle, the pulsator 14 will connect the teat cups to the vacuum line 15, and the pressure within the teat cup shells will rapidly decrease below atmospheric and thence to the maximum vacuum level at which the pressure within the vacuum line 15 is regulated. By applying pressure to the cow in a gradually increasing manner, rather than rapid application and maintenance of the maximum pressure, the massaging action of hand milking or the suckling action of a nursing calf is best approximated. It is thus believed that this type of massaging action provides the most effective stimulation of the cow without presenting the possibility of injuring the cow by the application of over-pressures. It may also be noted that in the typical teat cup construction, over-pressures are naturally prevented because the teat cup inflation is not positively sealed to the outer shell and will pop off when excessive pressures, (usually above approximately 15 psig.) are applied in the volume between the shell and the inflation.

Figure 3:
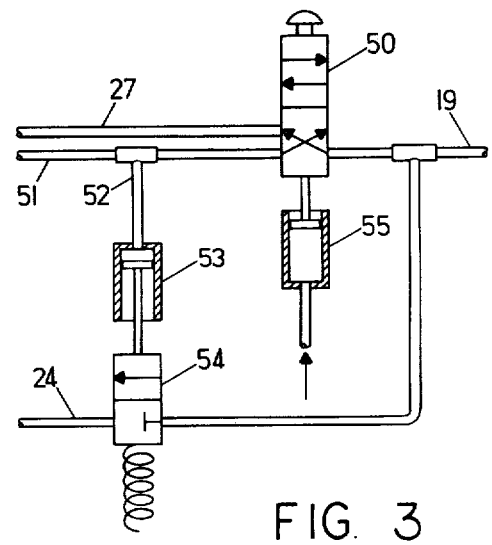
FIG. 3 is an alternative embodiment showing a portion of an automatic milking machine detacher mechanism which can be utilized to provide the air pressure and initiation signals to the stimulator control.

The automatic stimulating apparatus can also be utilized in conjunction with automatic teat cup detaching equipment. An example of the control logic for such equipment is shown in U.S. Pat. No. 3,991,716 to Reisgies. The control initiation apparatus to be utilized in conjunction with automatic detaching equipment is shown in FIG. 3, which substitutes for the actuator valve shown within the dashed lines labeled 18 in FIG. 2. Basically, the high pressure air supply line 19 is directed to a four-way manually actuated valve 50 which is shown in its normal idle position in FIG. 3. In this position air pressure is supplied to the control line 27 which leads through the restrictor 28 to the air chamber 39. A second pressure line 51 is provided within the control apparatus of the detacher, with a line 52 being taped therefrom to the pilot drive 53 of a spring biased two-way normally closed valve 54. The valve 54 is interposed in the air pressure line 24 which is tapped off of the main air supply line 19. The actuating valve 50 is manually depressed into its position opposite to that shown in FIG. 3 to start the detaching cycle. At the end of the detaching cycle, the valve 50 is driven back to its initial position by an air pressure activated pilot drive 55. It is seen that upon manual actuation of the valve 50, air pressure is supplied to the line 51 which causes the pilot drive 53 to switch the valve 54 to its open position, thereby providing air pressure through the line 24 to allow stimulation to take place. The interposition of the valve 54 in the air supply line 24 provides isolation of the stimulator system from the controlling air circuitry of the detacher mechanism. For example, if the line 24 were directly tapped off of the air line 51, the pulses of air being supplied through the line 24 might interfere with the timing of the detaching system. Although an example of an air operated detaching system is shown in FIG. 3, it is understood that other types of controls could be utilized, for example by substituting an electrically operated solenoid in place of the pneumatically operated pilot drive 55.

Figure 4:
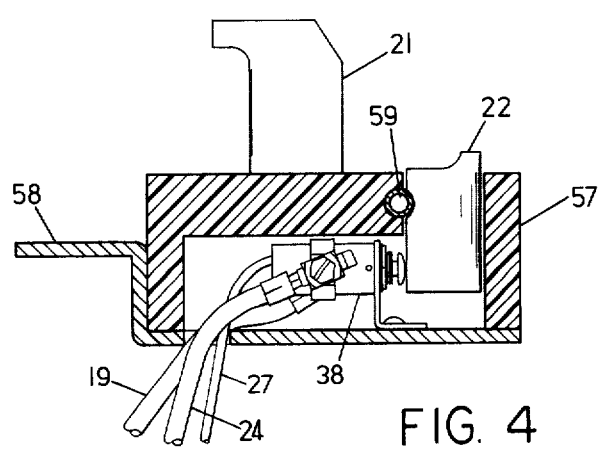
FIG. 4 is a partial cross-sectional view of the claw hanger actuator, taken along the line 4—4 of FIG. 1.

The physical construction of the claw hanger actuator 18 is best shown in the views of FIGS. 1 and 4. In FIG. 1, an exterior perspective view of a preferred embodiment of the actuator includes a substantially box-like casing 57, with the claw engaging hook 21 and the actuating button 22 extending from the top surface thereof. A mounting bracket 58 is attached to the bottom of the actuator body with a portion thereof extending for mounting on the milking stall. The milking claw is slipped over the hook 21 so as to rest on the button 22 which rotates about a pivot 59 to depress the valve 38 (not shown in FIG. 4).

The internal structure of the claw hanger is shown in the cross-sectional view of FIG. 4. The spring biased actuator valve 38 is mounted to the bracket 58 such that the head thereof is in position to be engaged by the body of the button 22 when it is rotated by the weight of the claw. In this normal position, the valve 38 is depressed to the position shown in FIG. 2, which connects the air pressure line 19 to the control line 27, and vents the air pressure line 24 to the atmosphere. Upon removal of the weight from the button 22, the valve shifts to its other position to supply air pressure from the line 19 to the line 24 and vents line 27 to the atmosphere to initiate the stimulation cycle.

It is understood that the invention is not confined to the particular construction and arrangement of parts herein illustrated and described, but embraces all such modified forms thereof as come within the scope of the following claims.

I claim:

1. Apparatus for providing selected automatic stimulation pressures to the teat cups of a milking machine through the atmospheric air input port of the vacuum line pulsator, comprising:
   (a) an air flow supply restrictor adapted to be connected to a source of air under pressure;
   (b) an air flow control valve connected to receive air flow from said restrictor and also adapted to receive atmospheric air and being switchable in response to a control signal to switch from providing air flow to its output to providing atmospheric pressure air to its output, the output of said air flow control valve being adapted to be connected to the atmospheric air input port of a vacuum line pulsator;
   (c) timing means responsive to an input signal and connected to said air flow control valve means to provide a control signal thereto to cause said control valve means to switch from providing air flow to its output to providing atmospheric pressure air to its output a selected period of time after said timing means has received an input signal indicative of the initiation of milking;
   whereby for a selected period of time after initiation of milking, the teat cup inflations are provided with alternating low and high pressure to stimulate letdown in the animal being milked, and whereby, after the selected period of time said timing means provides a control signal to switch said control valve such that atmospheric air is thereafter provided to the pulsator and the pulsator subsequently provides alternating low and atmospheric pressure to the teat cups as in normal milking.

2. Apparatus for providing selected automatic stimulation pressures to the teat cups of a milking machine through the atmospheric air input port of the vacuum line pulsator, comprising:
   (a) a variable air flow supply restrictor adapted to be connected to a source of air under pressure and adjusted such that the maximum high pressure applied to the teat cup inflations is between approximately 5 psig and 10 psig;
   (b) an air flow control valve connected to receive air flow from said restrictor and also adapted to receive atmospheric air and being switchable in response to a control signal to switch from providing air flow to its output to providing atmospheric pressure air to its output, the output of said air flow control valve being adapted to be connected to the atmospheric air input port of a vacuum line pulsator;
   (c) timing means responsive to an input signal and connected to said air flow control valve means to provide a control signal thereto to cause said control valve means to switch from providing air flow to its output to providing atmospheric pressure air to its output a selected period of time after said timing means has received an input signal indicative of the initiation of milking;
   whereby for a selected period of time after initiation of milking, the teat cup inflations are provided with alternating low and high pressure to stimulate letdown in the animal being milked, and whereby, after the selected period of time said timing means provides a control signal to switch said control valve such that atmospheric air is thereafter provided to the pulsator and the pulsator subsequently provides alternating low and atmospheric pressure to the teat cups as in normal milking.

3. Apparatus for providing selected automatic stimulation pressure to the teat cups of a milking machine through the atmospheric air input port of the vacuum line pulsator, comprising:
   (a) an air flow supply restrictor adapted to be connected to a source of air under pressure;
   (b) an air flow control valve connected to receive air flow from said restrictor and also adapted to receive atmospheric air and being switchable in response to an air pressure control signal to switch from providing air flow to its output to providing atmospheric pressure air to its output, the output of said air flow control valve being adapted to be connected to the atmospheric air input port of a vacuum line pulsator;
   (c) timing means responsive to an air pressure input signal which is indicative of the initiation of milking and connected to said air flow control valve means to provide an air pressure control signal thereto to cause said control valve means to switch from providing air flow to its output to providing atmospheric pressure air to its output a selected period of time after said timing means has received an air pressure input signal indicative of the initiation of milking;
   whereby for a selected period of time after initiation of milking, the teat cup inflations are provided with alternating low and high pressure to stimulate letdown in the animal being milked, and whereby, after the selected period of time said timing means provides a control signal to switch said control valve such that atmospheric air is thereafter provided to the pulsator and the pulsator subsequently provides alternating low and atmospheric pressure to the teat cups as in normal milking.

4. The apparatus of claim 3 including an actuating valve connected to said timing means and to said restrictor and adapted to be connected to a source of high air pressure, said actuating valve being adapted to be manually actuated to provide an air pressure input signal to said timing means and high air pressure to said restrictor at the initiation of milking.

5. The apparatus of claim 4 wherein said timing means includes an air flow restrictor connected to said actuating valve and a volume chamber connected to receive air flow from said timing means restrictor and also connected to said air flow control valve to provide a pressure signal thereto equivalent to the pressure in said volume chamber, said actuating valve before the initiation of milking providing high air pressure to said timing means air flow restrictor and communication with atmospheric air pressure to said supply restrictor whereby the air pressure in said volume chamber builds up to the pressure of the air pressure source, and wherein upon manual actuation said actuating valve provides air under pressure to said air flow supply restrictor and provides communication to the atmosphere to said timing means air flow restrictor whereby air in said volume chamber flows therefrom through said timing means air flow restrictor at a controlled rate to reduce the air pressure in said volume chamber over a selected period of time.

6. The apparatus of claim 5 wherein said air flow control valve comprises a two position valve spring biased to a first position and having an air drive piston pneumatically connected to said timing chamber to switch said flow control valve to its second position and maintain it in such position when the pressure on said drive piston is above a selected minimum pressure, said flow control valve providing atmospheric air to its output in its first position and providing air flow under pressure to its output from said air flow supply restrictor in its second position, whereby said air flow control valve is in its second position at the initiation of milking and switches over to its first position a period of time after the initiation of milking when the air pressure within said volume chamber is less than that required by said drive piston to maintain said valve against the force of said biasing spring.

7. The apparatus of claim 3 wherein said actuating valve is incorporated within a claw hanger actuator, said claw hanger actuator comprising a casing, a claw engaging hook extending from said casing, an actuating button mounted to the casing for limited rotation at a position adjacent to the claw engaging hook such that a milking claw slipped over the hook will rest on the button and rotate it about its rotatable mounting to the piston, said button having a portion thereof extending downwardly in position to engage with said actuator valve, said actuator valve being springed biased to drive said button upwardly around its pivot and to be depressed when the weight of the claw hanger rotates said button downwardly.

8. Apparatus for providing selected automatic stimulation pressures to the teat cups of a milking machine through the atmospheric air input port of the vacuum line pulsator, comprising:
  (a) an air flow supply restrictor adapted to be connected to a source of air under pressure;
  (b) an air flow control valve connected to receive air flow from said restrictor and also adapted to receive atmospheric air and being switchable in response to a control signal to switch from providing air flow to its output to providing atmospheric pressure air to its output, the output of said air flow control valve being adapted to be connected to the atmospheric air input port of a vacuum line pulsator;
  (c) timing means responsive to an input signal and connected to said air flow control valve means to provide a control signal thereto to cause said control valve means to switch from providing air flow to its output to providing atmospheric pressure air to its output a selected period of time after said timing means has received an air pressure input signal indicative of the initiation of milking, whereby for a selected period of time after initiation of milking, the teat cup inflations are provided with alternating low and high pressure to stimulate let-down in the animal being milked, and whereby, after the selected period of time said timing means provides a control signal to switch said control valve such that atmospheric air is thereafter provided to the pulsator and the pulsator subsequently provides alternating low and atmospheric pressure to the teat cups as in normal milking; and
  (d) an air flow indicator connected to the output of said air flow control valve and adapted to be connected to the atmospheric air input port of a vacuum line pulsator, said indicator comprising walls defining a hollow chamber in communication with the output of said air flow control valve and a piston indicator which rises up and down within said chamber in response to the air pressure within said chamber, whereby said piston rises upwardly when air is flowing under pressure to the vacuum line pulsator to indicate to the operator that stimulation is taking place, and whereby said piston is withdrawn into the chamber when atmospheric air is being supplied to the atmospheric air input port of the vacuum line pulsator.

* * * * *